United States Patent [19]

Hori et al.

[11] Patent Number: 4,737,093
[45] Date of Patent: Apr. 12, 1988

[54] DIE LOCKING MECHANISM FOR A MOLDING APPARATUS

[75] Inventors: Nobuo Hori; Mituharu Hirota, both of Kawaguchi, Japan

[73] Assignee: Kabushiki Kaisha Sanjoseiki Seisakusho, Saitama, Japan

[21] Appl. No.: 871,758

[22] Filed: Jun. 6, 1986

[30] Foreign Application Priority Data

Jun. 7, 1985 [JP] Japan .......................... 60-086205[U]
Nov. 6, 1985 [JP] Japan .......................... 60-170543[U]
Nov. 6, 1985 [JP] Japan .......................... 60-170544[U]

[51] Int. Cl.⁴ .................... B29C 45/66; B29C 45/84
[52] U.S. Cl. ............................. 425/151; 425/192 R; 425/450.1; 425/595; 425/DIG. 221
[58] Field of Search .................... 425/190, 192 R, 541, 425/591, 593, 595, 451.4, 451.5, 451.6, 451.7, 135-138, 150, 451, 151-154, DIG. 221

[56] References Cited

U.S. PATENT DOCUMENTS

| 81,560 | 8/1868 | Torney | 425/451.4 X |
| 2,452,382 | 10/1948 | Long | 425/DIG. 221 |
| 2,456,349 | 12/1948 | Ward | 425/DIG. 221 |
| 2,923,976 | 2/1960 | Strauss | 425/DIG. 221 |
| 3,199,159 | 8/1965 | Wernecke | 425/DIG. 221 |
| 3,883,286 | 5/1975 | Kinslow, Jr. et al. | 425/451.4 X |
| 4,473,346 | 9/1984 | Hehl | 425/190 X |
| 4,555,228 | 11/1985 | Nishiike et al. | 425/192 R X |

FOREIGN PATENT DOCUMENTS 384194 1/1965 Switzerland ............. 425/DIG. 221

Primary Examiner—Richard L. Chiesa
Attorney, Agent, or Firm—Wenderoth, Lind & Ponack

[57] ABSTRACT

A die locking mechanism for a molding apparatus including stationary and movable die assemblies, has a stop bar movable back and forth with respect to the stationary frame structure in a direction parallel with the direction of movement of the movable die assembly, and a locking member rockable between first and second angular positions about a fixed pivot axis. The locking member has a cam lobe portion generally arcuately curved about the pivot axis and is engageable with the stop bar, the cam lobe portion being disengaged from the stop bar with the locking member in the first angular position and being engageable with the stop bar with the locking member in the second angular position so that the movable die assembly is locked in position with respect to the movable die assembly.

17 Claims, 6 Drawing Sheets

DIE LOCKING MECHANISM FOR A MOLDING APPARATUS

BACKGROUND OF THE INVENTION

1. Field of the Invention:

The present invention relates to a die locking mechanism and, more particularly, to a die locking mechanism for a molding apparatus having at least one movable die assembly. Such a molding apparatus may be an injection molding, compression molding or transfer molding machine having at least one stationary die assembly and at least one movable die assembly. Alternatively, a molding apparatus to which a die locking mechanism according to the present invention is to be applied may be a blow molding machine having a sectional mold consisting of two mold halves.

2. Description of the Related Art:

During operation of an injection molding machine, it is sometimes required that the machine be temporarily shut down with the movable die assembly of the machine held in a certain position with respect to the stationary die assembly. On the other hand, there is a known injection molding machine which is equipped with a safety door which, when held closed, prohibits operator access to the die blocks of the machine. In the case of an injection molding machine having such a safety door, it is desirable that the movble die assembly of the machine be held at rest in a certain position whenever access to the die assemblies is allowed to the operator of the machine with the safety door opened up either accidentally or for any purpose.

An injection molding machine having a safety door arrangement is for these reasons further equipped with a die locking mechanism which is adapted to have the movable die assembly locked under predetermined conditions of the machine such as when the safety door is held in an open position. Such a prior-art die locking mechanism however has some drawbacks in that, for example, the stop position at which the movable die assembly is to be brought to a stop by means of the locking mechanism is dictated uniquely by the geometry of the die locking mechanism. The present invention contemplates the provision of an improved die locking mechanism which will eliminate such drawbacks of a prior-art die locking mechanism for a molding apparatus, typically an injection molding machine.

SUMMARY OF THE INVENTIN

In accordance with the present invention, a die locking mechanism for a molding apparatus includes a stationary frame structure, a stationary die assembly fixed with respect to the frame structure and a movable die assembly movable with respect to the frame structure toward and away from the stationary die assembly, comprising (a) an elongated first locking member movable back and forth with respect to the stationary frame structure in a direction substantially parallel with the direction of movement of the movable die assembly with respect to the frame structure, and (b) a second locking member which is rockable between first and second angular positions about a pivot axis fixed with respect to the stationary frame structure and which has a cam lobe portion generally arcuately curved about the aforesaid pivot axis and engageable with the first locking member, the cam lobe portion being disengaged from the first locking member when the second locking member is in the first angular position thereof and being engageable with the first locking member when the second locking member is in the second angular position thereof. The die locking mechanism according to the present invention may further comprise (c) actuator means movable in opposite first and second directions with respect to the stationary frame structure and engageable with the second locking member for driving the second locking member toward the aforesaid first angular position when moved in the first direction, the actuator means being disengaged from the second locking member for allowing the second locking member to turn toward the aforesaid second angular position when the actuator means is moved in the second direction. In this instance, the die locking mechanism may further comprise (d) bias means urging the second locking member to turn toward the aforesaid second angular position about the aforesaid pivot axis, the second locking member being turned by the bias means into the aforesaid second angular position about the aforesaid pivot axis when disengaged from the actuator means with the actuator means moved in the aforesaid second direction.

BRIEF DESCRIPTION OF THE DRAWINGS

The drawbacks of a prior-art die locking mechanism for a molding apparatus and the features and advantages of a die locking mechanism according to the present invention will be more clearly appreciated from the following description taken in conjunction with the accompanying drawings in which like reference numerals designate similar or corresponding structures, assemblies, members and elements and in which.

DESCRIPTION OF THE PRIOR ART

Figure 1:
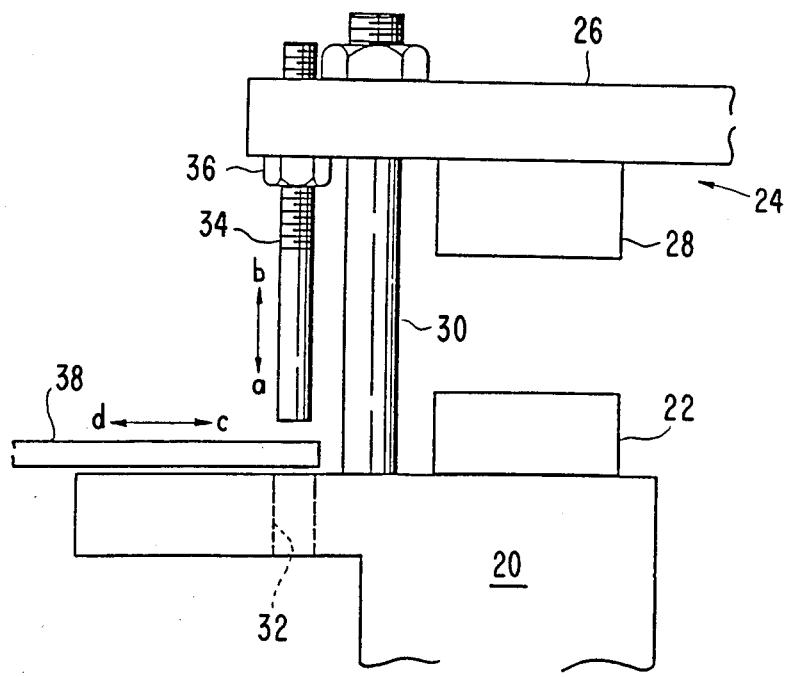
FIG. 1 is a front elevation view schematically showing the general construction of a vertical-type injection molding machine including a prior-art die locking mechanism.

Referring to FIG. 1 of the drawings, an injection molding machine equipped with a prior-art die locking mechanism is shown including a lower stationary frame structure 20 which has a stationary die block 22 fixedly mounted thereon. Over the stationary frame structure 20 is provided a movable die assembly 24 which includes a die plate 26 and an upper movable die block 28 positioned in alignment with the lower stationary die block 22 and fixedly attached to the die plate 26. The die plate 26 is operatively connected to or otherwise engaged by a suitable drive unit (not shown) and is movable with respect to the stationary frame structure 20 along vertical guide posts one of which is shown at 30. The stationary frame structure 20 has a vertical axial bore 32 extending therethrough so as to be open at both ends, as indicated by dotted lines. To the movable die plate 26 is screwed a stop bar 34 extending parallel to the guide post 30 and axially aligned with the bore 32 in the frame structure 20 as shown. The stop bar 34 is axially movable, together with the die assembly 24, downwardly and upwardly with respect to the frame structure 20 as indicated by arrowheads a and b, respectively, and is thus alternately admitted into and withdrawn out of the axial bore 32 in the frame structure 20 as the die assembly 24 is driven to the frame structure 20. The stop bar 34 has a threaded axial portion and is fitted to the die plate 26 by means of a nut 36 which permits adjustment of the length which the stop bar 34 projects downwardly from the die plate 26.

The axial bore 32 formed in the frame structure 20 forms part of the die locking mechanism which further includes a blocking plate 38 which is horizontally movable on or over the frame structure 20 into a position closing the bore 32 in the frame structure 20 as indicated by arrowhead c and a position allowing the bore 32 to open as indicated by arrowhead d. The blocking plate 38 is connected to or otherwise engaged by a safety door (not shown), which is arranged to be movable with respect to the stationary frame structure 20 for allowing access to the die blocks 22 and 28 only when the door is in a predetermined "open" position as is well known in the art. When the injection molding machine is in operation, the safety door is held in a "closed" position prohibiting access to the die blocks 22 and 28. With the door being held in the closed position, the blocking plate 38 is maintained in a position allowing the axial bore 32 in the frame structure 20 to be open at its upper end. As the die plate 26 is driven for movement with respect to the frame structure 20 so that the upper movable die block 28 moves into and out of mating engagement with the lower stationary die block 22, the stop bar 34 also moves axially in the directions of arrows a and b into and out of the bore 32 in the frame structure 20.

In the die locking mechanism of the injection molding maching shown in FIG. 1, the blocking plate 38 is arranged to be responsive to the movement of the safety door between the open and closed positions thereof. With the movement of the safety door to the open position, the blocking plate 38 is thus caused to move in the direction of arrowhead c on or over the frame structure 20 into the position closing the bore 32 in the frame structure 20 as shown. If the movable die assembly 24 is driven downward under such conditions, the lower end of the stop bar 34 strikes against the blocking plate 38 intervening between the stop bar 34 and the bore 32 in the frame structure 20 and prohibits further downward movement of the die assembly 24 with respect to the frame structure 20. The movable die assembly 24 as a whole is in this fashion prevented from being moved toward the frame structure 20 beyond a predetermined vertical position which is dictated by the distance of movement which the stop bar 34 is to be moved until the stop bar is brought into contact with the blocking plate 38.

On the other hand, it is sometimes required, during operation of the injection molding machine, that the machine be temporarily shut down with the movable die assembly 24 held in a certain position with respect to the stationary frame structure 20. Such a necessity will arise when, for example, it is desired that the combination of the stationary and movable die blocks 22 and 28 be exchanged with another combination or at least one of the die blocks 22 and 28 be temporarily disassembled from the die plate 26 for servicing purposes. Also, emergency shutdown of the machine may be necessitated in the event any failure of the machine is detected or any unnecessary machine parts are found left in or are allowed into the die blocks 22 and 28 during operation of the machine so that the machine requires urgent remedying of the failure or urgent removal of the unnecessary machine parts. It is also desirable for safety sake that the movable die assembly 24 be held at rest in a certain position whenever access to the die blocks 22 and 28 is allowed to the operator of the machine with the safety door opened up either accidentally or for any purpose.

The prior-art die locking mechanism of the described nature is useful for proviiding assurance of safety for the operator working on the die blocks 22 and 28 during a shutdown period of the machine. Such a die locking mechanism however has a drawback in that the stop position in which the die assembly 24 is to be brought to a stop above the frame structure 20 is dictated solely by the length which the stop bar 34 projects downwardly from the die plate 26 toward the frame structure 20. Thus, the stop position in which the die assembly 24 is to be maintained with respect to the stationary frame structure 20 may be appropriate for stationary and movable die blocks of one design but may be inappropriate for die blocks of another design. If it is desired that the stop position which has been selected for one combination of stationary and movable die blocks be changed for another combination, it is necessary to have the stop bar 34 re-adjusted with respect to the die plate 26 to vary the length of the stop bar 34 which projects from the die plate 26 toward the frame structure 20. Re-adjustment of the stop bar 34 with respect to the die plate 26 can be effected by manually turning the nut 36 on the threaded axial portion of the stop bar 36. Considerable amounts of time and labor are required for such re-adjustment of the stop bar 34 in addition to those required for the exchange of the die blocks. The proper stop position of the die assembly 24 will vary not only from one combination of stationary and movable die blocks to another but also depending on the purpose for which the die assembly 24 is to be held at rest. The prior-art die locking mechanism of the described nature thus suffers from the lack of flexibility in varying the stop position of the movable die assembly and is not fully acceptable from the view point of providing ease and convenience in the adjustment of the stop position of the movable die assembly.

Figure 2:
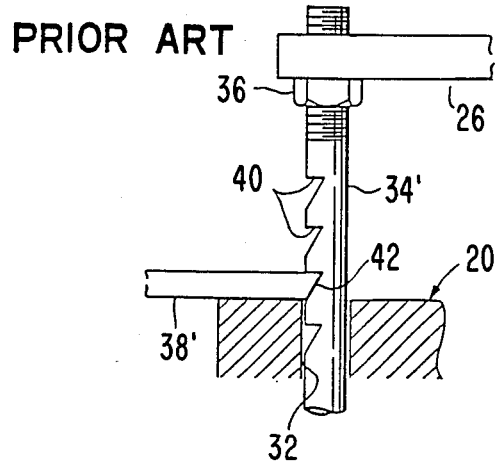
FIG. 2 is a front elevation view showing, partly in section, portions of a modification of the prior-art die locking mechanism in the injection molding machine illustrated in FIG. 1.

Such a problem of the die locking mechanism as has been described with reference to FIG. 1 is to some extent alleviated in a prior-art die locking mechanism shown in FIG. 2. The die locking mechanism herein shown uses a stop bar 34' having a series of notches 40 arranged at certain pitches axially along the stop bar and a blocking plate 38' having a wedge-shaped tip portion 42 shaped to conform to each of the notches 40. Thus, the blocking plate 38' is permitted to engage the stop bar 34' through any one of the notches 40 in the stop bar. Accordingly, the movable die assembly (herein represented by the movable die plate 26 can be brought to a stop in any of the positions which respectively correspond to the notches 40 in the stop bar 34'. The stop position in which the movable die assembly is to be held by means of the die locking mechanism can thus be varied stepwise depending on whichsoever of the notches 40 is to be selected to provide engagement between the blocking plate 38' and the stop bar 34'. The die locking mechanism of this nature is however still not fully satisfactory for providing various optimum stop positions for the movable die assembly. This is apparently because of thef act that the change of the stop position achieved by means of the die locking mechanism is only stepwise and can not be exactly proper for each of the various purposes for which the die assembly may be held at rest. It may also be pointed out that, in each of the described prior-art die locking mechanisms, the blocking plate 38 or 38' involves linear motion in moving into the position to block the stop bar 34 or 34' after the safety door is initially moved to or from the open or closed position. The die locking mechanism could not be for this reason promptly responsive to initiation of the movement of the safety door to or from the open or closed position of the door. Other problems would result from the impact created between the stop bar 34 or 34' and the blocking plate 38 or 38' whe the latter strikes against the former.

It is, accordingly, an important object of the present invention to provide an improved die locking mechanism for a molding apparatus wherein the movable die assembly can be brought to a stop in any desired position with respect to the stationary frame structure of the molding apparatus by means of the die locking mechanism.

It is another important object of the present invention to provide an improved die locking mechanism for a molding apparatus wherein the position in which the movable die assembly is to be held at rest with respect to the stationary frame structure of the apparatus can be varied continuously so as to be an optimum position for the purpose for which the die assembly is to be held at rest.

It is still another important object of the present invention to provide an improved die locking mechanism for a molding apparatus wherein the movable die assembly can be brought to a stop promptly in response to initial movement of the safety door provided for the molding apparatus or of any appropriate alternative thereof.

It is still another important object of the present inventon to provide an improved die locking mechanism for a molding apparatus wherein the movable die assembly can be brought to a stop without creating any mechanial impact between the membes which are to be brought into engagement with each other in response to initial movement of the safety door or of any appropriate alternative thereof.

DESCRIPTION OF THE PREFERRED EMBODIMENTS

Figure 3:
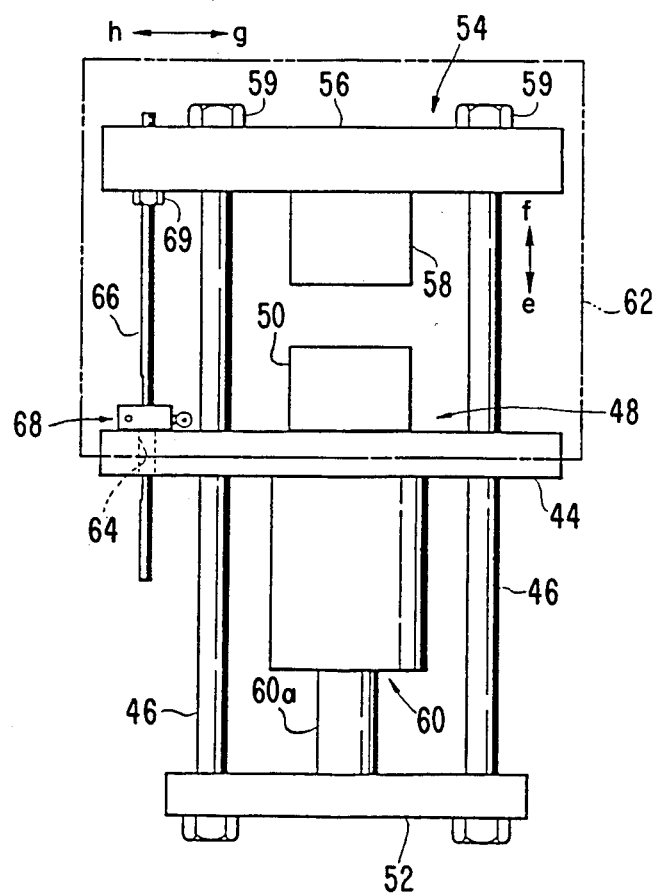
FIG. 3 is a front elevation view schematically showing the general construction and arrangement of an injection molding machine incorporating a first preferred embodiment of a die locking mechanism according to the present invention.

Referring to FIG. 3 of the drawings, a first preferred embodiment of a die locking mechanism according to the present invention is shown provided in a molding apparatus which is an injection molding machine of the vertical type by way of example. The injection molding machine has a stationary frame structure which includes a horizontal die plate 44. A suitable number of upright tie bars or vertical guide members 46 slidably extend through the die plate 44 and are spaced apart in paralle from each other as shown. The die plate 44 forms part of a lower stationary die assembly 48 which further comprises a stationary die block 50 fixedly mounted on the die plate 44. The guide members 46 are connected together at their lower ends by a horizontal drive plate 52 which forms part of the die drive means to be described. Over the stationary die assembly 48 is provided an upper movable die assembly 54 which comprises a horizontal movable die plate 56 vertically movable together with the guide members 46 and a movable die block 58 fixedly attached to the underside of the die plate 56. The die plate 56 is securely connected to the guide members 46 by suitable fastening mens such as nuts 59 as shown. As is well known in the art, the stationary and movble die blocks 50 and 58 which are thus positioned in a face-to-face relationship to each other have respetive internal cavities which are shaped to form a unitary cavity when the die blocks 50 and 58 are engaged.

The upper movable die assembly 54 is associated with a suitable drive unit adapted to drive the die assembly 54 toward and away from the lower stationary die assembly 48 as indicated by arrowheads e and f, respectively, so that the movable die block 58 is brought into mating engagement with the stationary die block 50. In the arrangement shown in FIG. 4, such a drive unit comprises a fluid-operated power cylinder 60 which includes a cylinder body secured to the underside of the staionary die plate 44 and a plunger 60a projecting downwardly from the cylinder body and connected at its lower end to the drive plate 52. Though not shown in the drawings, the power cylinder 60 communciates with a suitable source of fluid under pressure through fluid passageways with solenoid-operated valves controlled by an electric control circuit and it hydraulically actuated in accordance with the control signals supplied from the control circuit, as is customary in the art. The plunger 60a of the power cylinder 60 is thus caused to axially retract into or protrude from the cylinder body as the cylinder 60 is actuated hydraulically. The axal movement of the plunger 60a is transmitted to the movable die assembly 54 through the drive plate 52 and guide members 46. The construction of the injection molding machine shown in Fig. 3 is merely by way of example and is subject to various changes and modifications if desired.

In the injection molding machine constructed as hereinbefore described, there is further provided a safety door which is only schematically indicated at 62. The safety door 62 serves as closure means to prohibit operator's access to the stationary and movable die assemblies 48 and 54 especially during operation of the molding machine and is in its entirety movable linearly, curvilinearly, pivotally or otherwise with respect to the stationary die assembly 48. In the embodiment herein shown, it is assumed also by way of example that the safety door 62 is linearly movable back and forth on a horizontal plane perpendicular to the direction of movement of the movable die assembly 54. The safety door 62 if further assumed to be movable rightwardly into a fully closed position prohibiting access to the die assemblies 48 and 54 as indicated by arrowhead g and a fully open position allowing access to the die assemblies 48 and 54 as indicated by arrowhead h.

In addition to the safety door 62 thus arranged is provided a die locking mechanism embodying the present invention. The die locking mechanism is provided in association with the stationary and movable die plates 44 and 56 with a vertical bore 64 formed in the lower stationary die plate 44 as shown and largely comprises an elongated locking member or stop bar 66 downwardly extending from the upper movable die plate 56 and a locking assembly 68 supported on the lower stationary die plate 44. The stop bar 66 is fitted to the movable die plate 56 by suitable adjustable fastening means such as a nut 69 engaging a threded upper end portion of the stop bar 66 and extends through the bore 64 in the lower stationary die plate 44. The locking assembly 68 is herein assumed to be positioned on the die plate 44 forming part of the lower stationary die assembly 48 but, if desired, may be disposed on or connected to any member forming part of or fixedly coupled to the stationary frame structure of the molding apparatus. The detailed construction of the die locking mechanism thus arranged generally is shown in FIGS. 4 and 5 of the drawings.

Figure 4:
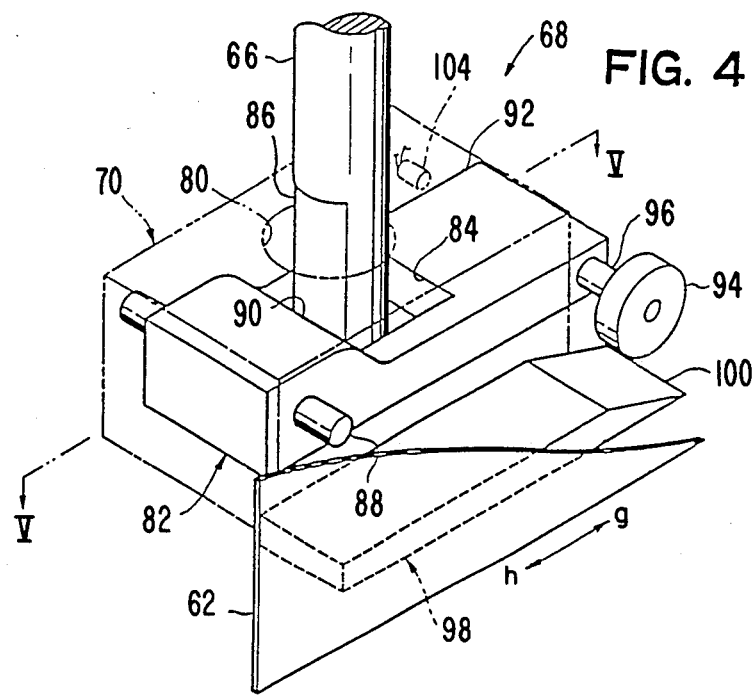
FIG. 4 is a perspective view showing, in an enlarged scale, the detailed construction of the die locking mechanism which is included in the injectin molding machine illustrated in FIG. 3.
Figure 5:
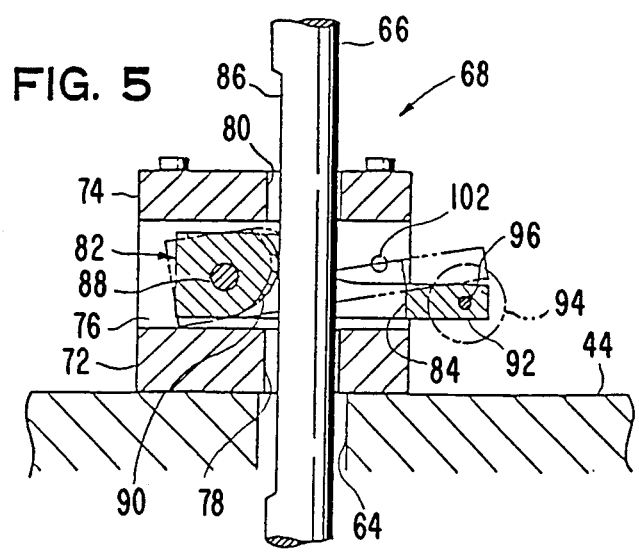
FIG. 5 is a sectional view taken along line V—V in FIG. 4.

Referring to FIGS. 4 and 5, the locking assemblies 68 of the die locking mechanism embodying the present invention compris a housing structure 70 fixedly mounted on the upper face of the lower stationary die plate 44. The housing structure 70 comprises lower and upper wall portions 72 and 74 which are spaced apart from each other to form a gap 76 therebetween, as shown in FIG. 5. These lower and upper wall portions 72 and 74 are formed with apertures 78 and 80, respectively, which are vertically aligned with each other across the gap 76. Within the gap 76 in the housing structure 70 is provided a rockable locking member 82 which is formed with an opneing 84 which is aligned with an located between the aperturs 78 and 80 in the housing structure 70. The stop bar 66 projecting downwardly from the upper movable die plate 56 (FIG. 3) extends through the apertures 78 and 80 in the housing structure 70 and the opening 84 in the locking member 82 into the bore 64 in the lower stationary die plate 44. The stop bar 66 has a flat sunk facet portion 86 extending axially along the bar over a length which is not less than the length which the stop bar 66 will extend through the opening 84 in the locking member 82. The rockable locking member 82 is pivotally connected to the housing structure 70 by a horizontal pivot shaft 88 extending in a direction perpendicular, in along nonintersecting relationship, to the stop bar 66 and is connected or journaled at its opposite ends to front and rear wall portions of the housing structure 70. The locking member 82 is thus rockable with respect to the housing structure 70 about the center axis of the pivot shaft 88 between a first angular position indicated by dotted lines in FIG. 5 and a second angular position indicated by solid lines in FIG. 5.

The locking member 82 has a cam lobe portion 90 defining one end of the opening 84 in the locking member 82 that is engageable in the opening 84 with the flat sunk facet portion 86 of the stop bar 66 within the gap 76 in the housing structure 70. The cam lobe portion 90 of the locking member 82 has a generally acruate cross section which is arcuately curved about the center axis of the pivot shaft 88 with a radius of curvature continuously increasing counterclockwise of the cam lobe portion 90 in FIG. 5. The cross-sectional configuration of the cam lobe portion 90 is, more specifically, such that the radius of curvature thereof continuously increases in one circumferential direction about the center axis of the pivot shaft 88, viz., in a direction in which the locking member 82 is to turn away from an angular position disengaged from the stop bar 66. As the rockable locking member 82 is turned clockwise from such a first angular position about the center axis of the pivot shaft 88, the cam lobe portion 90 of the locking member 82 is thus gradually brought into engagement with the sunk facet portion 86 of the stop bar 66 as will be described in more detail. The locking member 82 further has, opposite to the above mentioned cam lobe portion 90, an end portion 92 projecting out of the housing structure 70. The end portion 92 of the locking member 82 carries a roller 94 which is rotatable on a pin 96 secured to the end portion 92 and extending parallel to the pivot shaft 88.

The roller 94 acts as a cam follower for a slide cam member 98 having a wedge-shaped cam portion 100 having a slanting upper face. The slide cam member 98 is connected to or engaged by the safety door 62 and is thus movable also in the directions of arrowheads g and h with respect to the frame structure of the injection molding machine shown in FIG. 3. When the safety door 62 is held in the fully closed position, the slide cam member 98 is located at a position with roller 94 received on the top surface thereof. The roller 94 and accordingly the end portion 92 of the locking member 82 are thus raised with respect to the housing structure 70 so that the locking member 82 is maintained in the first angular position about the center axis of the pivot shaft 88. If, on the other hand, the safety door 62 is hled in the fully open position, then the slide cam member 98 is located off the roller 94 with the result that the roller 94 is disengaged from the slide cam member 98. The result is that the roller 94 and the end portion 92 of the locking member 82 are allowed to lower with respect to the housing structure 70 by gravity resulting from the weight of the end portion 92. As a consequency, the locking member 82 is maintained in the second angular position about the center axis of the pivot shaft 88, as will be described in more detail.

Further provided in the housing structure 70 is a position sensor 102 responsive to the positioning of the locking member 82 in the first angular position about the center axis of the pivot shaft 88. The position sensor 102 is operative to produce a signal in response to movement of the locking member 82 into or out of the first angular position with respect to the housing structure 70. The signal is supplied to the control circuit for the valves incorporated in the fluid passageways for the power cylinder 60 (Fig.3). Such a position sensor 102 may be a photoelectric transducer sensitive to a beam of light reflected from the locking member 82. Furthermore, the end portion 92 of the locking member 82, by its own weight, served in effect as a biasing means operative to urge the locking member 82 to turn toward the second angular position about the center axis of the pivot shaft 88. If desire, such biasing means may be provided in combination with any other form of biasing means such as, for example, a compression or tension spring (not shown) which may be disposed in association with the locking member 82, thought not shown in the drawings.

When, the safety door 62 (FIG. 3) of the injection molding machine is held in the fully closed position, the slide cam member 98 of the die locking mechanism assumes a position having the roller 94 received on the top surface thereof so that the locking member 82 is held in the first angular position about the center axis of the pivot shaft 88. With the rockable locking member 82 being held in the first angular position, the cam lobe portion 90 of the locking member 82 is disengaged from the stop bar 66 and allows the stop bar 66 to axially move freely through the opening 84 in the locking member 82. These conditions of the die locking mechanism are detected by the position sensor 102 so that the injection molding machine operates ordinarily under the control of the signals generated on the basis of the signal from the sensor 102.

If the safety door 62 is opened wider from the fully closed position and is thus moved in the direction of arrowhead h shown in Fg. 3 under these conditions, the slide cam member 98 is moved accordingly so that the roller 94 rolls down the slanting upper face of the cam portion 100 of the slide cam member 98. It therefore follows that the locking member 82 as a whole is allowed to turn clockwise with respect to the housing structure 70 toward the second angular position about the center axis of the pivot shaft 88 by reason of the force of gravity resulting from the weight of the end portion 92 of the locking member 82. As the locking member 82 is turned toward the second angular position, the cam lobe portion 90 of the locking member 82 is gradually brought ito engagement with the sunk facet portion 86 of the stop bar 66 and impedes free axial movement of the stop bar 66 through the opening 84 in the locking member 82 with an increasing force. With the safety door 62 then moved to the fully open position, the wedge-shaped cam portion 100 of the slide cam member 98 is completed disengaged from the roller 94 so that the locking member 82 is allowed to stay in the second angular position about the center axis of the pivot shaft 88. With the locking member 82 being held in the second angular position, the cam lobe portion 90 of the locking member 82 is tightly forced against the sunk facet portion 86 of the stop bar 66 and prevents the stop bar 66 from moving through the opening 84 in the locking member 82. Now that the stop bar 66 is locked by the locking member 82, the movable die assembly 54 (FIG. 3) is also locked in a certain position with respect to the stationary die assembly 48. In response to further movement of the locking member 82 out of the first angular position, the position sensor 102 produces a signal on the basis of which the supply of the working pressure to the power cylinder 60 (FIG. 3) is interrupted under the control of the signals generated in the control circuit for the fluid passageways for the power cylinder 60. The injection molding machine is thus compulsorily brought to a stop or maintained in a shutdown condition with the movable die assembly 54 (FIG. 3) locked in a certain position with respect to the stationary die assembly 48.

Figure 6:
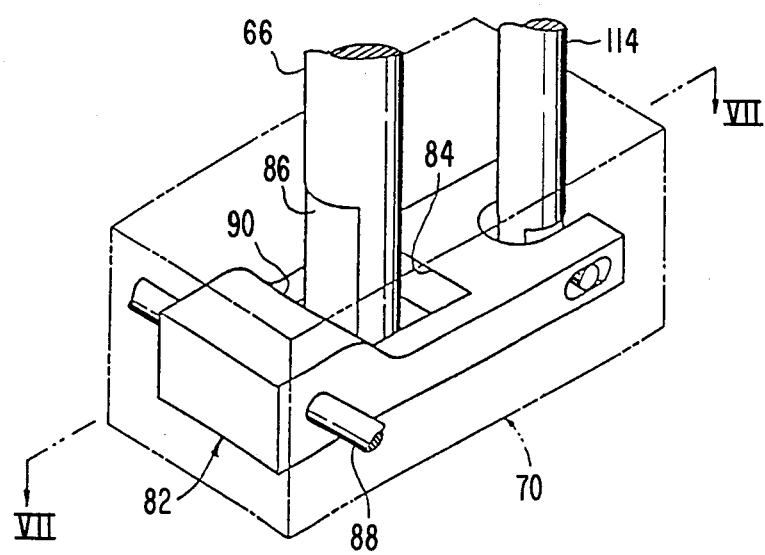
FIG. 6 is a perspective view showing the construction of a second preferred embodiment of a die locking mechanism according to the present invention.
Figure 7:
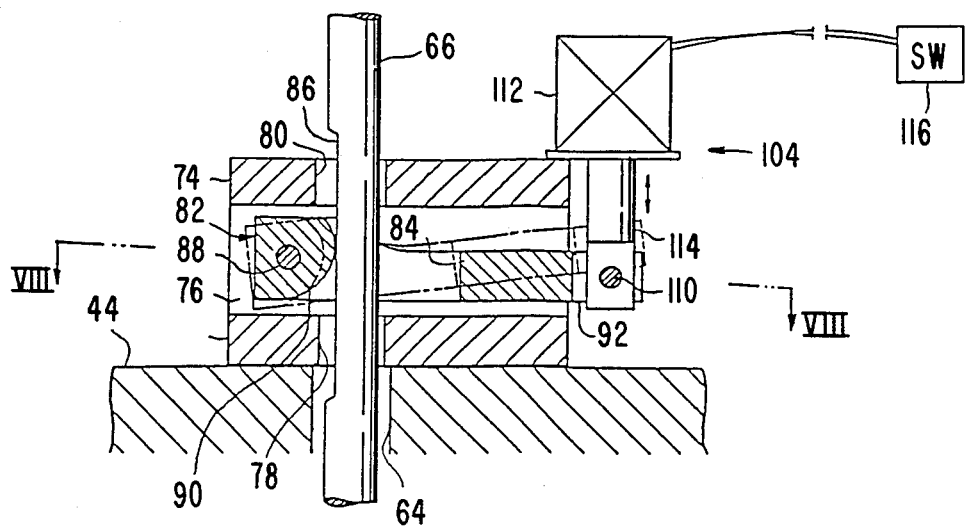
FIG. 7 is a sectional view taken along line VII—VII in FIG. 6.
Figure 8:
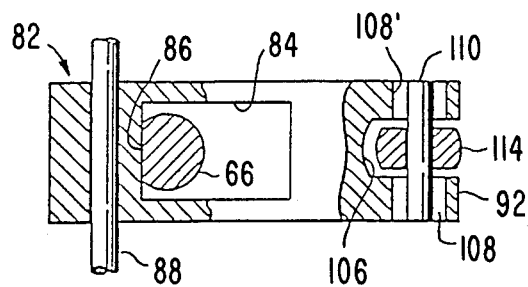
FIG. 8 is a horizontal sectional view taken along line VIII—VIII in FIG. 7.

FIGS. 6, 7 and 8 of the drawings show the locking assembly of a second preferred embodiment of a die locking mechanism according to the present invention. The locking assembly herein shown is largely similar in construction and arrangement to the locking assembly 68 in the embodiment hereinbefore described with reference to FIGS. 4 and 5 and is distinct over the locking assembly 68 by the provision of a solenoid-operated actuator unit 104 as an alternative to the combination of the roller 94 and slide cam member 98 in the embodiment of FIGS. 4 and 5.

Referring to FIGS. 6 and 7 of the drawings, the solenoidoperated actuator unit 104 is provided in association with the rockable locking member 82 of the locking assembly. As will be better seen from FIG. 8, the locking member 82 of this locking assembly has in its end portion 92 a recess 106 extnding toward but isolated from the opening 84 in the locking member 82 and a pair of slots 108 and 108' which are aligned with each other across the recess 106. As will be best seen from FIG. 6, the slots 108 and 108' are horizontally elongated in directions perpendicular in a non-intersecting relationship to both of the stop bar 66 and pivot shaft 88. A pin 100 extends between these elongated slots 108 and 108' through the recess 106 and has its end portions slidably received in the slots 108 and 108', respectively. The above mentioned solenoid-operated actuator unit 104 largely consists of a solenoid device 112 and an actuator plunger 114 projecting downwardly from the solenoid device 112 as shown in FIG. 7. The actuator plunger 114 is axially movable upwardly and downwardly and is pivotally connected to the pin 110. The plunger 114 is for example, biased to remain in a raised or axially retracted position when the solenoid device 112 remains de-energized and is driven to axially protrude downwardly when the solenoid device 112 is energized. The solenoid device 112 is electrically connected to a switch circuit 116 which includes a switch to be actuated when the die blocks are being exchanged and sensors responsive to failure of any functional members and units of the injection molding machine and/or existence of unnecessary machine parts within the injection molding machine. If desired, the switch control circuit 116 may also include a sensor responsive to the movement of the safety door 62 (FIG. 3).

With the solenoid device 112 of the actuator unit 104 de-energized, the actuator plunger 114 is held in the raised or axially retracted position so that the rockable locking member 82 of the locking assembly is held in the first angular position about the center axis of the pivot shaft 88 as indicated by dotted lines in FIG. 7. With the locking member 82 being held in the first angular position, the cam lobe portion 90 of the locking member 82 is disengaged from the stop bar 66 and allows the stop bar 66 to axially move freely through the opening 84 in the locking member 82. When the solenoid device 112 is then energized by a control signal supplied from the control circuit 116 with, for example, the safety door 62 (FIG. 3) moved from the fully closed position, the plunger 114 of the actuator unit 104 is caused to protrude downwardly from the solenoid device 112. As a consequence, the rockable locking member 82 of the locking assembly is caused to turn from the first angular position to the second angular position about the center axis of the pivot shaft 88 as indicated by solid lines in FIG. 7. As the locking member 82 is turned toward the second angular position, the cam lobe portion 90 of the locking member 82 is brought into engagement with the sunk facet portion 86 of the stop bar 66 and impeded free axial movement of the stop bar 66 through the opening 84 in the locking member 82 with an increasing force. With the plunger 114 extending over its full stroke, the locking member 82 stays in the second angular position about the center axis of the pivot shaft 88. With the locking member 82 being held in the second angular position, the cam lobe portion 90 of the locking member 82 is tightly forced against the sunk facet portion 86 of the stop bar 66 and prevents the stop bar 66 from moving through the opening 84 in the locking member 82. Now that the stop bar 66 is locked by the locking member 82, the movable die assembly 54 (FIG. 3) is also locked in a certain position with respect to the stationary die assembly 48.

Figure 9:
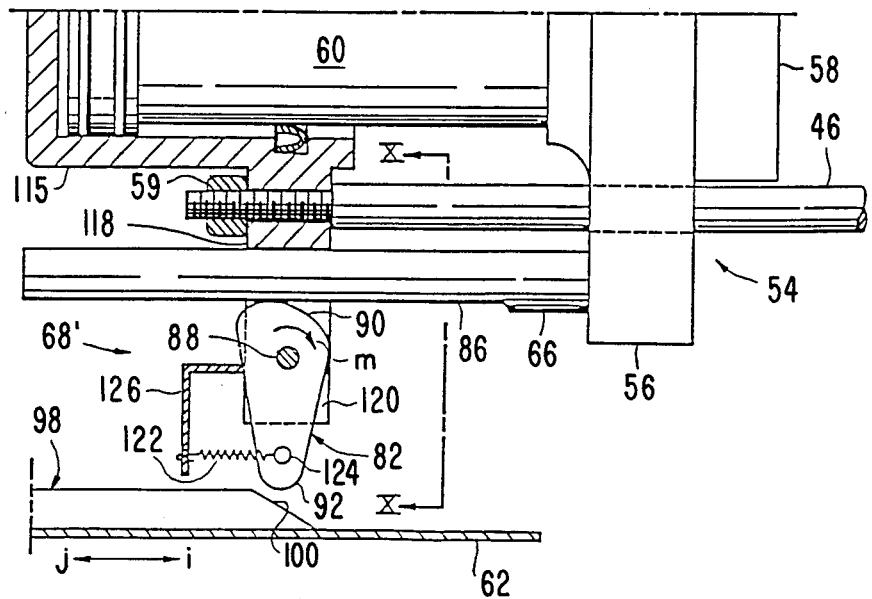
FIG. 9 is a fragmentary side elevation view showing portions of a horizontal-type injection molding machine incorporating a third preferred embodiment of a die locking mechanism according to the present invention.
Figure 10:
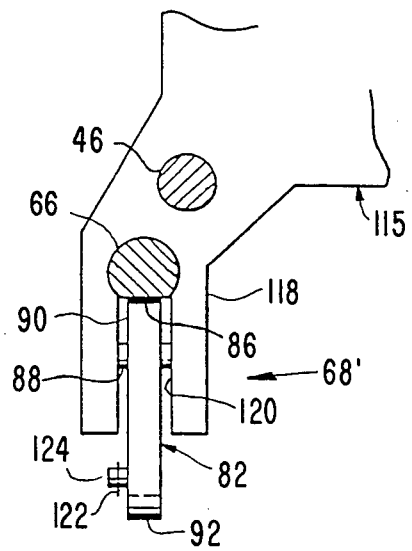
FIG. 10 is a sectional view taken along line X—X in FIG. 9.
Figure 11:
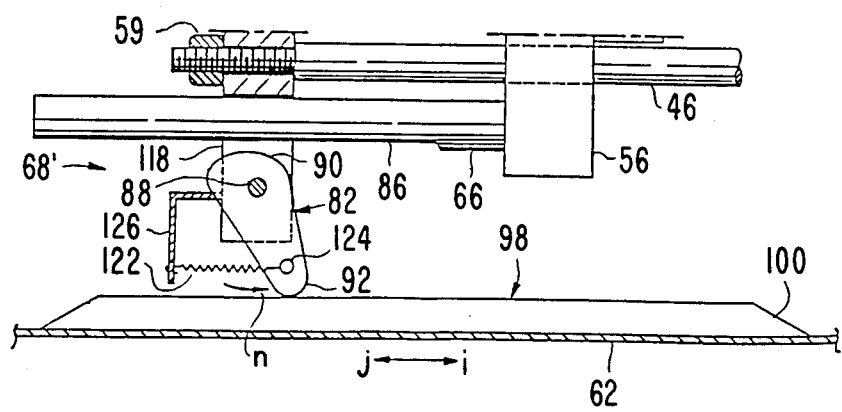
FIG. 11 is a view similar to FIG. 9 but shows the die locking mechanism under a different condition of the injection molding machine shown in FIG. 9.

While the die locking mechanism embodying the present invention has been described as being applied to an injection molding machine of the vertical type, the gist of the present invention can be similarly applicable to another type of molding apparatus. FIGS. 9, 10 and 11 of the drawings show a preferred embodiment of a die locking mechanism according to the present invention as applied to an injection molding machine of the horizontal type.

In FIG. 9, an injection molding machine of the horizontal type is shown comprising a stationary support member 115 having supported thereon the plunger of a fluid-operated power cylinder 60 which is operatively connected to a movable die assembly 54, the plunger of the power cylinder 60 being horizontally movable with respect to the stationary support member 115. The movable die assembly 54 comprises a movable die plate 56 that is horizontally movable with guide members one of which is shown at 46 and a movable die block 58 fixedly attached to the die plate 56. The support member 115 has a lug portion 118 to which the guide member 46 is securely connected by suitable fastening means such as a nut 59. Though not shown, the movable die assembly 54 is associated with a stationary die assembly fixedly supported by the stationary frame structure and is driven for movement toward and away from the stationary die assembly by means of the plunger of power cylinder 60 so that the die block 58 engages the stationary die block.

In the horizontal injection molding machine thus constructed, there is further provided a safety door which is only schematically indicated at 62. The safety door 62 is assumed by way of example as being linearly movable back and forth in opposite directions parallel with the direction of movement of the movable die assembly 54. The safety door 62 is further assumed to be movable rightwardly into a fully closed position prohibiting access to the die assemblies as indicated by arrowhead i and a fully open position allowing access to the die assemblies as indicated by arrowhead j.

In addition to the safety door 62 thus arranged, a die locking mechanism embodying the present invention is provided. The die locking mechanism is provided in association with the movable die plate 56 with a slot 120 formed in the lug portion 118 of the support member 115 as shown and largely comprises an elongated locking member or stop bar 66 extending from the movable die plate 56 and a locking assembly 68' supported by the lug portion 118. The slot 120 in the lug portion 118 of the support member 115 is elongated generally at right angles to the stop bar 66. The stop bar 66 is fitted at one end to the movable die plate 56 and extends through the slot 120 in the lug portion 118 as will be better seen from FIG. 10. The stop bar 66 has a flat sunk facet portion 86 extending axially along the bar 66 over a length which is not less than the length which the stop bar 66 will axially move through the slot 120 in the lug portion 118 of the support member 115.

The locking assembly 68' in the embodiment shown herein comprises a rockable locking member 82 which is in part slidably received in the slot 120 in the lug portion 118 and which is pivotally connected to the lug portion 118 of the support member 115 by means of a horizontal pivot shaft 88. The pivot shaft 88 extends through the slot 120 in the lug portion 118 in a direction perpendicular and in a non-intersecting relationship to the sop bar 66. The locking member 82 is thus rockable with respect to the lug portion 118 of the support member 115 about the center axis of the pivot shaft 88 in directions of arrows m and n between a first angular position disengaged from the stop bar 66 (FIG. 11) and a second angular position engageable with the stop bar 66 (FIG. 9) as will be discussed in more detail. The locking member 82 has a cam lobe portion 90 directed toward the stop bar 66 and engageable with the flat sunk facet portion 86 of the stop bar 66 within the slot 120 in the lug portion 118. The cam lobe portion 90 of the locking member 82 has a generally arcuate cross-section which is arcuately curved about the center axis of the pivot shaft 88 with a radius of curvature which continuously increases counterclockwise of the cam lobe portion 90 in FIGS. 9 and 11. As in the embodiment described with reference to FIGS. 4 and 5, the cross-sectional configuration of the cam lobe portion 90 is such that the radius of curvature thereof continuously increases in one circumferential direction about the center axis of the pivot shaft 88, viz., in a direction in which the locking member 82 is to turn away from an angular position disengaged from the stop bar 66. In other words, the radius of curvature thereof continuously increases in a direction opposite to the direction in which the locking member 82 is to be turned toward an angular position to engage the stop bar 66. As the rockable locking member 82 is turned clockwise from the first angular position about the center axis of the shaft 88, the cam lobe portion 90 of the locking member 82 is thus gradually brought into engagement with the sunk facet portion 86 of the stop bar 66 as will be described in more detail. The locking member 82 further has opposite to the cam lobe portion 90 a generally semicircularly rounded end portion 92 projecting out of the slot 120 in the lug portion 118.

Engageable with the end portion 92 of the locking member 82 is a slide cam member 98 having a wedge-shaped cam portion 100 with a slanting upper face. The slide cam member 98 is connected to or engaged by the previously mentioned safety door 62 and is thus movable also in the directions of arrowheads i and j with respect to the support member 115 of the injection molding machine. The locking member 82 is associated with suitable biasing means urging the locking member 82 to turn with respect to the lug portion 118 in a direction of arrow m (FIG. 9) about the center axis of the pivot shaft 88. In the embodiment shown herein, such biasing means comprises a preload helical tension spring 122 which is anchored at one end to a pin 124 projecting from the end portion 92 of the locking member 82 and at the other to a spring retainer element 126 secured to the lug portion 118 as shown. If desired, there may be further provided a position sensor similar to the position sensor 102 provided in the embodiment described with reference to FIGS. 4 and 5 responsive to movement of the locking member 82, though not shown in FIGS. 9 to 11.

Under conditions in which the safety door 62 is held in the fully closed position, the slide cam member 98 is positioned to have the end portion 92 of the locking member 82 received on the top surface thereof as shown in FIG. 11. Under these conditions, thelocking member 82 is held in the first angular position about the center axis of the pivot pin 88 against the force of the return spring 122 so that the cam lobe portion 90 of the locking member 82 is maintained disengaged from the stop bar 66 with its end portion 92 raised with respect to the lug portion 118 of the support member 115. The stop bar 66 is accordingly allowed to axially move freely through the slot 120 in the lug portion 118 of the support member 115. If the safety door 62 is then moved toward the fully open position, the slide cam member 98 is moved in the direction of arrow j so that the end portion 92 of the locking member 82 which has been received on the top surface of the slide cam member 98 rides down the slanting upper face of the cam portion 100 of the slide cam member 98. The locking member 82 is thus allowed to turn in the direction of arrow m (FIG. 9) about the center axis of the pivot shaft 88 by the force of the return spring 122 and reaches the second angular position when the slide cam member 98 is disengaged from the locking member 82 as shown in FIG. 9. With the locking member 82 turned to the second angular position about the center axis of the shaft 88, the cam lobe portion 90 of the locking member 82 is brought into engagement with the sunk facet portion 86 of the stop bar 66. The stop bar 66 is now prevented from being axially moved with respect to the support member 115 so that the movable die assembly 54 is locked to the support member 115. If the safety door 62 is thereafter moved from the fully open position back toward the fully closed position, the slide cam member 98 is moved in the direction of arrow i so that the end portion 92 of the locking member 82 is first received on the slanting upper face of the cam portion 100 of the slide cam member 98, the locking member 82 turns in the direction of arrow n (FIG. 11) about the center axis of the pivot shaft 88 against the force of the return spring 122. The locking member 82 reaches the first angular position about the center axis of the pivot pin 88 as shown in Fig. 11 when the end portion of the locking member 82 is received on the top surface of the slide cam member 98 with the safety door 62 moved to the fully closed position. With the locking member 82 turned to the first angular position about the center axis of the shaft 88, the cam lobe portion 90 of the locking member 82 is disengaged from the stop bar 66 and allows the stop bar 66 to axially move freely with respect to the support member 115.

While a few preferred embodiments of a die locking mechanism according to the present invention have been herein described and shown, such embodiments are merely by way of example and are thus subject to modification and change where necessary or if desired and the true spirit and scope of the present invention is seen to embrace such modifications and changes as fall within the scope of the appended claims.

What is claimed is:

1. A molding apparatus including a stationary frame structure, a stationary die assembly fixed with respect to the frame structure, a movable die assembly movable with respect to the frame structure toward and away from the stationary die assembly, drive means for driving the movable die assembly toward and away from the stationary die assembly during operation of the molding apparatus, and a die locking mechanism for holding the movable die assembly when the molding apparatus is inoperative in any desired position through which the movable die assembly moves with respect to the stationary die assembly, said die locking mechanism comprising
    (a) an elongated first locking member movable back and forth with respect to said stationary frame structure in a direction substantially parallel to the direction of movement of said movable die assembly with respect to the frame structure, and
    (b) a second locking member which is rockable between first and second angular positions about a pivot axis fixed with respect to said stationary frame structure and which has a generally acruate cam lobe portion pivotable about said pivot axis and engageable with said first locking member, said cam lobe portion being disengaged from said first locking member when the second locking member is in the first angular position and being directly locked with the first locking member irrespective of the position of the first locking member relative to the second locking member when the second locking member is in said second angular position thereof.

2. A molding apparatus including a die locking mechanism, a stationary frame structure, a stationary die assembly fixed with respect to the frame structure and a movable die assembly movable with respect to the frame structure toward and away from the stationary die assembly said die locking mechanism comprising
    (a) an elongated first locking member movable back and forth with respect to said stationary frame structure in a direction substantially parallel to the direction of movement of said movable die assembly with respect to the frame structure, and
    (b) a second locking member rockable between first and second angular positions about a pivot axis fixed with respect to said stationary frame structure and having a generally arcuate cam lobe portion pivotable about said pivot axis and engageable with said first locking member, the cam lobe portion being disengaged from said first locking member when the second locking member is in the first angular position and being engaged with the first locking member when the second locking member is in the second angular position,
    said cam lobe portion having a cross-section that is arcuately curved with a radius of curvature which continuously varies about said pivot axis such that as said second locking member is rocked from said first angular position toward said second angular position about said pivot axis, the cam lobe portion is gradually brought into sliding contact and thereafter surface-to-surface pressing contact with said first locking member with a force which continuously increases as the second locking member is rocked closer to said second angular position.

3. A molding apparatus as set forth in claim 1 or 2, and further comprising
    actuator means movable in opposite first and second directions with respect to said stationary frame structure and engageable with said second locking member for driving the second locking member toward said first angular position when moved in the first direction, said actuator means being disengageable from said second locking member for allowing said second locking member to rock toward said second angular position when moved in said second direction.

4. A molding apparatus including a stationary frame structure, a stationary die assembly fixed with respect to the frame structure, a movable die assembly movable with respect to the frame structure toward and away from the stationary die assembly, safety closure means movable with respect to frame structure in a first direction into and in a second direction out of a predetermined position at which the safety closure means prohibits access to the stationary and movable die assemblies, and a die locking mechanism responsive to movement of said safety closure means in each of the first and the second directions, said die locking mechanism comprising (a) an elongated first locking member movable back and forth with respect to said stationary frame structure in a direction substantially parallel with the direction of movement of said movable die assembly with respect to the frame structure, and (b) a second locking member rockable between first and second angular positions about a pivot axis fixed with respect to said stationary frame structure and having a generally arcuate cam lobe portion pivotable about said pivot axis and slidable on said first locking member, said cam lobe portion of the second locking member being disengaged from said first locking member when the second locking member is in the first angular position and being directly locked with the first locking member irrespective of the position of the first locking member relative to the second locking member when the second locking member is in said second angular position, said second locking member being responsive to the movement of said safety closure means into and out of said predetermined position thereof for moving towardsaid first angular position in response to movement of the safety closure means in said first direction and for moving toward said second angular position in response to movement of the safety closure means in said second direction.

5. A molding apparatus as set forth in claim 4, and further comprising actuator means movable with said safety closure means and engageable with said second locking member for driving the second locking member toward said first angular position in response to movement of said safety closure means in said first direction and toward said second angular position in response to movement of said safety closure means in said second direction.

6. A molding apparatus including a die locking mechanism, a stationary frame structure, a stationary die assembly fixed with respect to the frame structure and a movable die assembly movable with respect to the frame structure toward and away from the stationary die assembly, said die locking mechanism comprising (a) an elongated first locking member movable back and forth with respect to said stationary frame structure in a direction substantially parallel to the direction of movement of said movable die assembly with respect to the frame structure, (b) a second locking member which is rockable between first and second angular positions about a pivot axis fixed with respect to said stationary frame structure and which has a generally arcuate cam lobe portion pivotable about said pivot axis and engageable with said first locking member, said cam lobe portion being disengaged from said first locking member when the second locking member is in the first angular position and being engaged with said first locking member when the second locking member is in the second angular position, and (c) actuator means movable in opposite first and second directions with respect to said stationary frame structure and engageable with said second locking member for driving the second locking member toward said first angular position when moved in the first direction, said actuator means being disengageable from said second locking member for allowing said second locking member to rock toward said second angular position when the actuator means is moved in the second direction.

7. A molding apparatus as set forth in claim 1, and further comprising bias means for urging said second locking member to rock toward said second angular position about said pivot axis, said second locking member being urged by said bias means to said second angular position when disengaged from said actuator means when the actuator means is moved in said second direction.

8. A molding apparatus as set forth in claim 1, wherein said cam lobe portion has a cross-section that is arcuately curved with a radius of curvature thereof that continuously varies about said pivot axis.

9. A molding apparatus as set forth in claim 1, 7 or 8, wherein said pivot axis is substantially perpendicular to and in a non-intersecting relationship with the direction of movement of said first locking member.

10. A molding apparatus as set forth in claim 1, 7 or 8, wherein said second locking member has an opening through which said first locking member is axially movable, said cam lobe portion defining one end of said opening.

11. A molding apparatus as set forth in claim 7 or 8, wherein said second locking member has opposite to said cam lobe portion an end portion for urging said second locking member toward said second angular position under the force of gravity due to the weight of the end portion, said bias means comprising said end portion of the second locking member.

12. A molding apparatus as set forth in claim 1, 7 or 8, wherein said actuator means comprises an electromagnetically operated member movable substantially in a direction parallel to the directin of movement of said first locking member and operatively connected to said second locking member for driving the second locking member toward one of said first and second angular positions when electromagnetically actuated.

13. A molding apparatus as set forht in claim 1, 7 or 8, wherein said actuator means comprises a movable member which is movable in said first and second directions with respect to said stationary frame structure and which has a slanting surface portion, said second locking member being engageable with said slanting surface portion when said movable member is moved in said first direction, the second locking member being moved into one of said first and second angular positions when engaging the slanting surface portion and being moved in the other of the first and second angular positions when disengaged from the slanting surface portion.

14. A molding apparatus as set forth in claim 13 wherein said second locking member has an end portion opposite to said cam lobe portion, said end portion of the second locking member being engageable with said slanting surface portion of said movable member.

15. A molding apparatus as set forth in claim 13, wherein said second locking member has an end portion opposite to said cam lobe portion, and said actuator means further comprises a roller which is rotatable about a center axis fixed with respect to said second locking member and which is rollably engageable with said slanting surface portion of said movable member.

16. A molding apparatus as set forth in claim 8, wherein said radius of curvature continuously increases in one circumferential direction about said pivot axis.

17. A molding apparatus as set forth in claim 16, wherein said radius of curvature continuously increases in a direction in which said second locking member rocks to disengage from said first locking member.

* * * * *